Nov. 6, 1962 G. J. CRITS 3,062,739
TREATMENT OF CHEMICAL WASTES
Filed Oct. 25, 1960
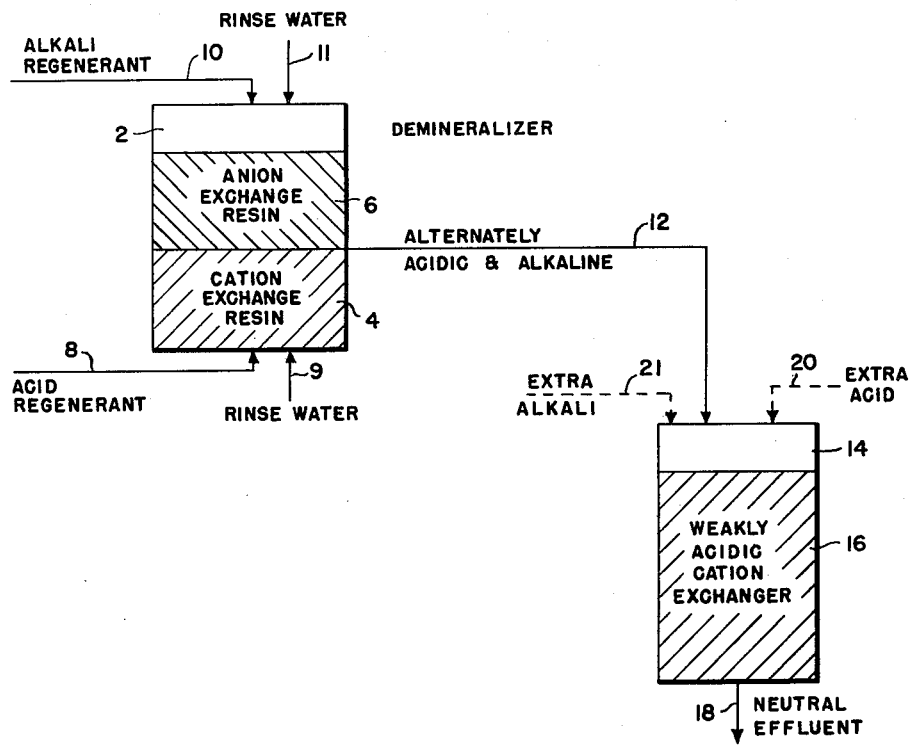
INVENTOR.
GEORGE J. CRITS
BY
*Busser, Smith & Harding*
ATTORNEYS United States Patent Office
3,062,739
Patented Nov. 6, 1962

3,062,739
TREATMENT OF CHEMICAL WASTES
George J. Crits, Havertown, Pa., assignor, by mesne assignments, to Crane Co., Chicago, Ill., a corporation of Illinois
Filed Oct. 25, 1960, Ser. No. 64,845
7 Claims. (Cl. 210—24)

This invention relates to the treatment of chemical wastes to produce approximately neutral or at least acceptable effluents to sewers, streams, or the like.

In many operations, such as chemical laboratories, chemical manufacturing, metal cleaning and finishing, water treatment, or the like, periodic alternate discharges of strong acid and strong alkalis are necessary. In other similar cases, large volumes of dilute acids and alkalis are discharged in alternation. In many instances, over an extended period of a day, a week, or more, the amount of acid and the amount of alkali are approximately equivalent, that is, if all of the wastes were impounded they would be, to a considerable extent, self-neutralizing. Impounding of large quantities of such wastes in acid-resistant vessels is expensive. Furthermore, these large vessels are located centrally or at a distance from the waste source, and long runs of acid-resistant piping are required at very substantial expense. The mutual neutralization is, of course, generally less expensive than the addition of purchased acid to neutralize alkaline waste when that occurs and purchased alkali to neutralize acid waste when that is flowing. This last procedure, furthermore, requires modulating type chemical feeders for both acid and alkali and extensive instrumentation for control of these. Therefore, despite its disadvantages self-neutralization has been employed.

It will be evident that in this procedure of self-neutralization, large storage spaces are required simply because of the amount of water associated with the waste flows, that is, the size of the storage space is not determined by the amounts of acid or alkali as such. In fact, the volume of storage space required varies inversely with the concentrations involved, more storage space per unit quantity of acid or alkali being required when the concentrations are low. Obviously, the storage space is also determined by the number of cycles desired to be self-neutralized in a given period of time and rate of flow of the liquid waste streams involved.

The ultimate objective of the neutralization is to maintain the ultimate effluent to a sewer or stream acceptable. Generally, relatively low ultimate acidity is permissible, and while greater amounts of alkalinity are often acceptable, there are frequent limitations even on the permissible alkalinity. The net result of this situation, therefore, is not only a requirement for large storage or impounding volume but the provision of acid or alkali feed to achieve a better approach to neutrality than is achieved by the self-neutralizing aspect of the procedure.

It is the broad object of the present invention to provide methods and apparatus which, in effect, impound the acid or alkali itself without impounding of the accompanying water. This means, in brief, that the vessel or vessels involved need not be sized on the basis of the volume of the original liquid wastes, but rather on the chemical equivalents of alkali and acid in the waste flow.

For simplicity in the following description, the term "neutral" is to be construed as referring to such approximation to neutrality as will be acceptable in an ultimately produced effluent. In this sense, "neutral" may be interpreted as applied to an effluent having a pH ranging from around 6 to 9, though in numerous instances pH values outside of this range are tolerable. Additionally, for the sake of simplicity, where reference is made to pounds of alkali or acid it will be understood that the pounds referred to relate to equivalent calcium carbonate, as is customary in the water treatment art.

Other objects of the invention will become more apparent from the following description read in conjunction with the accompanying drawing, in which the FIGURE is a diagram of a particular system which is well illustrative of the invention.

In this figure the invention is illustrated as applied to take care of the wastes from a conventional demineralizer. This is chosen as an example because not only is there involved a cyclical repetition of flow of strong acid and alkali wastes but of dilute wastes as well, together with the production of neutral salts which, on first consideration, might be considered as presenting additional difficulties.

Referring, therefore, specifically to the illustrated example, there is indicated at 2 a demineralizer, specifically shown as of the mixed bed type, though, as will be immediately evident, what is of significance would apply to any other form of demineralizer. In the mixed bed type of demineralizer, during the working part of a cycle of operation, a single bed comprises a mixture of anion exchange resin and cation exchange resin. When regeneration is required, stratification of the resins is produced in conventional fashion to separate the two forms into lower and upper beds, the lower of which generally consists of the cation exchange resin as indicated at 4, while the upper consists of the anion exchange resin as indicated at 6. This condition, which is the one of interest in the matter of the present invention is illustrated. Regeneration is then first effected by the introduction of acid regenerant at 8, the introduction of rinse water at 9, the introduction of alkali regenerant at 10, and the introduction of rinse water at 11. The effluents from all these steps are delivered from the meeting region of the beds to the waste conduit 12. Conventional damming with water may be used to prevent invasion of the wrong beds by the regenerants. Finally, the resins of the two beds are intermixed in preparation for the duty cycle in the operation. For simplicity, the various other flow connections are omitted from the showing of the demineralizer, since all that is of interest is the sequence of outflows through the waste connection 12.

The flow through the waste connection is, then, successively, of strong acid, dilute acid, strong alkali, and dilute alkali, each of these flows involving, furthermore, a content of neutral salts. The invention, from the standpoint of this specific illustration, accordingly involves the production of an ultimate effluent which is satisfactorily neutral.

To receive the wastes from the conduit 12, there is provided a tank 14 containing, in the specific illustration, weakly acidic cation exchanger 16. The tank 14 may take various forms which are not of particular significance, the form chosen being dictated merely by considerations of convenience and other conditions having essentially nothing to do with the invention.

The tank, for example, may be in the form of a pressure vessel, and the influent may be introduced at either the top or the bottom of the bed; or the tank may comprise an open gravity vessel in which, again, the influent may be introduced at either the top or the bottom. Structural details, therefore, are not disclosed.

The cation exchanger 16 may be of numerous types, typified by the acrylic carboxylic, or the phosphoric acid types of resin exchangers. Usable also are known exchangers of the phenolic base carboxylic type, the so called phosphonic and phosphorous types, and those of the sulphonated coal or carbonaceous types. A highly satisfactory resin which may be here used is the carboxylic cation exchanger commercially known as "Amberlite IRC-50." Cation exchangers of these weakly acidic types have the following characteristics making them suitable for the practice of the present invention:

In neither the acid nor alkali salt conditions do they react substantially with neutral salts. Preferably used are the very weak ones which have practically no action on neutral salts; but it is permissible to use those of somewhat greater strength which may produce some salt splitting without rendering the effluent unacceptably off neutral condition. Accordingly, the neutral salts which are produced during regeneration in the demineralizer will, at least for the most part, pass through the exchanger 16 in unchanged condition to the effluent line 18.

In the acid condition sodium ions from both sodium hydroxide and carbonate will be removed to leave, respectively, water and carbonic acid. In the case of the carbonate, however, the reaction is reversible, but the effluent is neither strongly acidic nor strongly alkaline.

With calcium hydroxide the acidic form of the resin takes out the calcium ions.

In the case of the salt form of the resin, even weak acids will effect exchange, so that both strong and weak acids will be neutralized. The affinity of the resins for hydrogen is so strong that hydrogen ions are readily taken on even by the calcium form of the resin.

The operation may be described as follows:

Starting with the cation exchanger 16 in initial condition in which it may be intermediate between its completely acid and completely salt conditions, and arbitrarily assuming starting with the acid regenerant cycle of the demineralizer, the strong and then the weak waste acids from the conduit 12 will undergo ion exchange with the exchanger so that the effluent 18 will contain only salts. During this part of the cycle, therefore, the exchanger will be gradually transformed toward its more acidic condition. As will appear more fully hereafter, the amount of the exchanger 16 is so chosen that at the end of the acid regenerant cycle the exchanger will still be capable of effecting neutralization to secure an effluent satisfactorily neutral.

Following this during the cycle of flow of the alkali regenerant, a reverse operation occurs, the acidic content of the exchanger now neutralizing first the strong alkali and then the weak alkali. Again the effluent would be neutral, the amount of the exchanger being chosen so that at the end of the alkali flow cycle the exchanger would be capable of neutralizing substantially more alkali.

If the amount of acid used for regeneration was equivalent to the amount of alkali used, the result would be to return the cation exchanger 16 to its original condition, with repeated operations well within the neutralizing capacity of the resin. However, this theoretical result is not, in practice, attainable. One or the other of the regenerants will usually be in excess of the equivalent amount. Accordingly, the amount of cation exchanger provided should be somewhat in excess of what would be theoretically required. Generally, there will be involved in the regeneration a known situation in which one or the other of the regenerants will be in excess (equivalently) of the other. Usually the alkali regenerant will be in excess. To maintain continuous operation, therefore, some extra acid must be introduced, and, this, in the figure, is indicated as introduced at 20. More practically, however, the extra acid would be introduced to take care of the excess alkali by introducing it through the connection 8 during the acid regenerant flow period. For insurance of continued operation under unusual conditions, it is also desirable to provide for adding extra alkali as at 21, though this may also be added as regenerant.

In the event that, as time goes on, it is found by tests that the intended neutral effluent is becoming, or is likely to become, more acidic or more alkaline, a corresponding correction may be achieved by introducing either additional acid or additional alkali as the situation may require. It is desirable to test for condition requiring correction by continuous or intermittent withdrawals of liquid for testing from a point of the exchanger bed, a short distance from its effluent outlet. Since the bed condition changes progressively from inlet to outlet, an unsatisfactory condition may be thus anticipated before the effluent becomes unsatisfactory.

At this point the substantial advantages of the invention may be noted. The cation exchanger 16 and its container 14 need now be sized only with respect to the actual acid and/or alkali contents of the introduced waste, with no account being taken of the water in the waste except from the standpoint of relatively minor matters which will be described. About five pounds of alkali or acid can be stored by each cubic foot of the ion exchange resin, and a figure of this type may serve as a basic measure for sizing the impounding ion exchange vessel and its contents. For comparison, there may be cited the following liquid volumes in cubic feet required to impound dilute wastes equivalent to five pounds of acid or alkali for various concentrations of acid or alkali: for a concentration of 1,000 parts per million, 80 cubic feet would be required; for 1% concentration 8 cubic feet would be required. Only when the concentration rises to 7.5% is there involved the same figure of one cubic foot given for the resin.

In actual design, of course, there must be considered the maximum deviations from average of the amounts of acid and/or alkali involved in a continuous flow period. In the case of a demineralizer, such variations may be expected to be relatively small, and accordingly, the quantity of exchanger may be kept to a minimum; however, in other processes, as will be referred to hereafter, the variations of acid or alkali delivered in single periods may be quite large, and consequently the exchanger must be sufficient in amount to take care of abnormal impoundings of the ions. Nevertheless, the amount of water involved may be dismissed from consideration. It will be understood, of course, that a suitable factor of safety should be chosen for any particular process of procedure so that the fluctuations of the condition of the bed do not reach points of ineffectiveness thereof.

Dependence on the amount of water is primarily with reference to the rate of flow. The cross-section of the bed in particular must be such as to offer no undue resistance to flow, and if the flow is upwardly, due account must be taken of velocity to prevent the carrying of the resin into the effluent. These, however, are considerations which are involved in all uses of exchange resins, and those skilled in the art will appreciate that quantities and dimensions must be so chosen as to take into account the physical situations involved.

As will be obvious now, neutralization in accordance with the invention may well be carried out utilizing in a tank as the exchanger a weakly basic anion exchanger instead of the weakly acidic cation exchanger. Typically, such exchangers may be resins of the usual polyamine type having styrene, phenol-formaldehyde, epoxy or other bases. Such weakly basic anion exchange resins are well-known in the art, and their characteristics as to neutral salts are the same as described for the cation exchangers, namely they are substantially unaffected by neutral salts. With respect to acids and alkalis, their actions are merely inverse to those already described for the cation exchangers, and it is, therefore, unnecessary to spell these out in detail.

As has already been indicated, the foregoing discussion of a demineralizer as the source of successive flows of acid and alkali has been merely illustrative, though representing an application of the invention of substantial commercial value; and it may be noted that if the demineralizer involves separate beds, the flows of regenerants may well overlap so that some neutralization may occur as the effluents mix en route to the exchanger 16. (This may also be the case in a mixed bed demineralizer when the two regenerations may occur, at least in part, simultaneously.) This, of course, may relieve the exchanger of part of its function, the exchanger then taking care of residual non-neutralization.

But the source of the alternating flows may be from a great many other processes or manufacturing procedures. For example, in the metal finishing arts, cleaners and other surface treating materials very often involve the sending to a drain of alternating quantities of acid and alkaline materials. In such cases it may be rather unusual that over an extended period these materials will neutralize each other. But by studies of average conditions and maximum deviations from the conditions, calculations may be easily made to determine both the quantity of ion exchanger to be used for impounding purposes and the excess of either acid or alkali, as the case may be, necessary to maintain neutral effluent. Deviations of the effluent from neutrality are used to determine the corrective action to be taken.

In order to provide the excess acid or alkali which may be required, it is advantageous to use the weakly acidic cation exchange resin since there may be used inexpensive sulphuric acid for introduction of acid, and inexpensive calcium hydroxide for addition of alkali, the latter being added as a slurry.

The invention may also be used in cases where predictions of the relative amounts of acid and alkali cannot be easily made, as in chemical laboratories. In such instances, there may usually be made estimates of the greatest deviations which could be expected over given periods as a day, or week, with the exchanger bed sized accordingly. In such instances measurements may be made from time to time on the effluent to determine the existing condition which may then be corrected by the introduction of calculated amounts of either acid or alkali. Under such conditions, of course, it would be desirable to regenerate the exchanger to a mid condition of approximately equal quantities of acid and salt conditions, or alkaline and salt conditions, or to some proportion which experience indicates, in connection with the practices or procedures involved will give the longest life between corrective actions and best factor of safety to the impounding process.

When the influent to the exchanger does not contain materials which would disturb or destroy its action, the influent thereto may pass directly from the source of waste as in the case of the demineralizer referred to. In other cases, however, pretreatments of the influent may be desirable. The use of screening, filtering, settling, coagulation and settling, and flotation to remove solid materials will be evident. In the case of oil content in the waste coagulation, absorption on added solid material such as fuller's earth or alum flocculation followed by filtering may be used to remove oil. Objectionable turbidity may be removed by alum or the like.

In the case of minor turbidity, up flow through the exchanger may be used so that the turbidity may pass through the ion exchanger bed. Periodic backwashing or scrubbing with air or water may also be used. These various expedients are merely those which are conventionally applied for the maintenance of ion exchange beds, and these and other techniques will be evident to those skilled in the art.

It will be evident from the foregoing that in accordance with the invention a process has been provided by which a satisfactorily neutral effluent may be continuously achieved with both a minimum involvement of the necessity for supplying purchased acid or alkali and with very substantial saving of impounding volume, the latter being primarily dependent on the fact that the volume required is relatively independent of the quantity of water contained in the waste. The volume of weak ion exchanger is thus dependent primarily on that minimum required to impound the extreme variations of inputs of the acidic and alkaline materials in respective acid and alkali flow periods, thereby to keep the exchanger in condition to provide satisfactorily neutral effluent at all times. It will be evident that various details of procedure may be used in modifying the practice of the invention in accordance with conditions encountered without departing from the invention as defined in the following claims. As used in the following claims the term "weak ion exchanger" is used to designate either the weakly acidic cation exchangers or the weakly basic anion exchangers equivalently usable as above described and having the properties of effecting no substantial splitting of neutral salts.

What is claimed is:

1. The method of continuously neutralizing successively generated quantities of acidic and alkaline waste materials comprising the steps of successively passing said acidic and alkaline quantities through the same weak ion exchanger in the order in which they are generated, the passage of each of said quantities effectively neutralizing that quantity while, at the same time, effectively regenerating said exchanger for use in neutralizing the passage of the subsequently generated quantity of waste material.

2. The method of continuously neutralizing successively generated quantities of acidic and alkaline waste materials comprising the steps of successively passing said acidic and alkaline quantities through the same weak cation exchanger in the order in which they are generated, the passage of each of said quantities effectively neutralizing that quantity while, at the same time, effectively regenerating said exchanger for use in neutralizing the passage of the subsequently generated quantity of waste material.

3. The method of continuously neutralizing successively generated quantities of acidic and alkaline waste materials comprising the steps of successively passing said acidic and alkaline quantities through the same weak anion exchanger in the order in which they are generated, the passage of each of said quantities effectively neutralizing that quantity while, at the same time, effectively regenerating said exchanger for use in neutralizing the passage of the subsequently generated quantity of waste material.

4. The method of continuously neutralizing successively generated quantities of acidic and alkaline waste materials comprising the steps of successively passing said acidic and alkaline quantities through the same weak ion exchanger in the order in which they are generated, the passage of each of said quantities effectively neutralizing that quantity while, at the same time, partially regenerating said exchanger for subsequent use in neutralizing the passage of the subsequently generated quantity of waste material, and maintaining by the addition of corrective ionic material said exchanger in a condition to keep the effluent therefrom substantially neutral.

5. The method of neutralizing the quantities of effluent resulting from successive regenerations of an ionic demineralizer which comprises the steps of successively passing each of said quantities through the same ion exchanger in the order in which said quantities are produced by said demineralizer, the passage of each of said quantities through said exchanger effectively neutralizing that quantity, as well as partially regenerating said exchanger for the passage of subsequently produced quantities of effluent.

6. In combination, a demineralizer including anion and cation exchangers, means for introducing acid regenerant for the cation exchanger, means for introducing alkali regenerant for the anion exchanger thereby producing successively acidic and alkaline quantities of effluent from said demineralizer, a weak ion exchanger, and means for successively introducing said quantities to the last recited exchanger for neutralizing said quantities and simultaneously regenerating said last recited exchanger.

7. In combination, a demineralizer including anion and cation exchangers, means for introducing acid regenerant for the cation exchanger, means for introducing alkali regenerant for the anion exchanger thereby producing successively acidic and alkaline quantities of effluent from said demineralizer, a weak ion exchanger, means for successively introducing said quantities to said last recited exchanger for neutralizing said quantities and simultaneously partially regenerating said last recited exchanger, and maintaining by addition of corrective ionic material said last recited exchanger in a condition to keep effluent therefrom substantially neutral.

References Cited in the file of this patent

UNITED STATES PATENTS

| | | |
|---|---|---|
| 2,248,055 | Bird | July 8, 1941 |
| 2,264,402 | Pattock | Dec. 2, 1941 |
| 2,275,210 | Urbain et al. | Mar. 3, 1942 |
| 2,404,367 | Durant et al. | July 23, 1946 |
| 2,660,558 | Juda | Nov. 24, 1953 |

OTHER REFERENCES

"Ion Exchange Technology," Academic Press Inc., New York (1956), pp. 97, 571 and 622 of primary interest.